United States Patent
Jasinski

[11] 3,995,943
[45] Dec. 7, 1976

[54] ALL SOLID ELECTROCHROMIC DISPLAY

[75] Inventor: Raymond Joseph Jasinski, Dallas, Tex.

[73] Assignee: Texas Instruments Incorporated, Dallas, Tex.

[22] Filed: Oct. 6, 1975

[21] Appl. No.: 619,734

[52] U.S. Cl. .......................................... 350/160 R
[51] Int. Cl.² ......................................... G02F 1/36
[58] Field of Search ............................... 350/160 R

[56] References Cited
UNITED STATES PATENTS 3,840,288  10/1974  Schnatterly ................. 350/160 R

OTHER PUBLICATIONS

Green et al. A Solid State Electrochromic Cell–The $R_bAg_4I_5/WO_3$ System, Thin Solid Films, vol. 24 (1974) pp. 45 & 46.

*Primary Examiner*—William L. Sikes
*Attorney, Agent, or Firm*—Harold Levine; James T. Comfort; William E. Hiller

[57] ABSTRACT

A totally solid electrochromic display cell comprising a display electrode of tungsten oxide or vanadium oxide, a counter electrode of metallic silver or a silver-containing compound, and a solid electrolyte of a mixed inorganic silver salt including silver iodide in contact with both electrodes.

10 Claims, 1 Drawing Figure

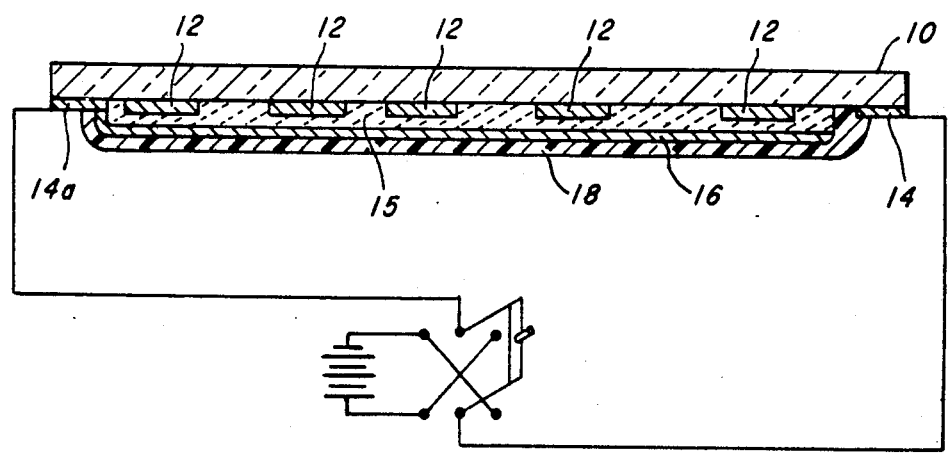

ALL SOLID ELECTROCHROMIC DISPLAY

This invention relates to electrochromic devices and more particularly to electrode-electrolyte systems for use as electrochromic information display devices.

Electrochromic devices may be described as devices in which a chemical change produced in response to the controlled application of an electric field results in a change in the reflective or transmissive properties of the device with respect to electromagnetic radiations. In information display devices using this property, the change is usually manifested as changes in color at selected shaped electrodes of the device so that there are displayed a number of alphanumeric characters to convey the information.

In one class of known devices, inorganic materials are used for all of the active elements of the cell which usually comprise at least two electrodes, an electrolyte and at times an insulator. In such a cell, one or both of the electrodes are of an electrochromic material. According to one theory of operation, applying an electrical potential across the electrodes causes ions present in the electrolyte to be adsorbed by one of the electrodes producing a change in color or transmissivity of the electrode. In most information displays, the change in color remains after removal of the electrical potential. Reversing the current in the circuit reverses the chemical reaction and the changed electrode then reverts to its original condition. Thus, it is the function of the electrolyte to supply or transport ions in the system.

Inorganic systems of the prior art have used tungsten oxide ($WO_3$) or vanadium oxide ($V_2O_5$) as display electrodes together with an electrolyte such as sulphuric acid or an aqueous salt solution and a metallic counter electrode. Upon application of the electric field, hydrogen or metal ions in the electrolyte are attracted to the display electrode and form tungsten or vanadium "bronzes" on the electrode to produce a blue color.

The construction of such a display cell involves problems in dealing with a liquid electrolyte such as the means required for sealing the electrolyte within the cell and leakages which can be the result of thermal or physical shocks or stresses. The requirement of adequately sealing the electrolyte, which may be very acitve chemically, within the cell adds to the expense of manufacture of the device.

Prior art attempts to overcome such problems have been directed to immobilizing the liquid electrolyte, such as by supporting it in gels, membranes, or matrixes. However, such systems still involve a "wet" electrolyte with associated problems and costs.

The present invention provides a totally solid electrochromic display cell through the use of a solid electrolyte material wherein silver ions are readily conducted or transported through the electrolyte, but "electronic" conduction is negligible. In such a system, the display electrode is of tungsten oxide or vanadium oxide, the solid electrolyte is of a mixed inorganic silver iodide salt or similar related silver compounds, and the counter electrode may be of metallic silver or silver compounds.

It is one object then of the present invention to provide an all-solid electrochromic display cell.

It is a further object of the present invention to provide a new electrochromic display system of more rugged construction than systems of the prior art.

It is a still further object of the present invention to provide an electrochromic display cell which is more easily and inexpensively constructed than those of the prior art.

These and other objects and advantages of the present invention will become apparent from the following detailed description when read with reference to the accompanying drawing in which the sole FIGURE schematically depicts an elevational cross-sectional veiw of an embodiment of the present invention.

Referring now to the drawing, the electrochromic display cell of the present invention comprises a transparent front panel 10 of glass or suitable plastic which may be thick enough to provide structural support for the remaining elements of the cell. On the back surface of the front panel, there has beed deposited a pattern of transparent electrically conductive regions 12 of a material such as tin oxide. These regions are in the shape of the digit display segments, their respective electrical leads, and external contacts as is well known in the art. Other transparent conductive coatings, such as indiun oxide or thin metallic platings may be used. Thereafter, a thin layer of an electrochromic material such as tungsten oxide or vanadium oxide is applied to the display segment regions 12 of the $SnO_2$ coating. This electrochromic material coating may be applied as by sputtering to a thickness of approximately 1 $\mu$m micron. Such materials are essentially transparent with a slight yellow tint, but as is well known, form bronzes when reacted with silver ions and become opaque or blue or blue-black in color. A thin insulating coating such as silicon oxide is applied over the "lead" portions of the tin oxide coating connecting the display segments to their respective external contact regions 14. These contact regions may have applied to them added metallic coatings such as gold or silver to provide good electrical contact to the internal electrodes of the cell. The insulative coating protects the tin oxide leads from the electrochemical action in the cell which could produce a coating of silver on these leads if they were not protected.

Next there is applied a layer 15 of solid electrolyte material which is conductive to silver ions but electrically insulated. One such material is silver rubidium iodide ($Ag_4RbI_5$).

The next layer 16 of the cell is a layer of metallic silver or silver containing compound which is electronically conductive and capable of supplying to the electrolyte material silver ions to replace those depleted from the electrolyte during operation of the cell. A silver tungsten bronze or silver vanadium bronze of the same type produced for the display electrodes is suitable for this counter electrode.

It should be noted that layer 16 is extended to one side to make contact with one of the external contact regions 14a.

Finally the cell is hermetically sealed by a layer 18 of sealant enclosing the electrode-electrolyte system. The sealant layer 18 may be any of the commonly used thermosetting plastics, epoxy resins or other suitable materials. Alternatively, a back panel of glass, ceramic or other material thick enough to provide structural support for the cell may be positioned against the back electrode and sealed around its peripheral edges to the front panel again using suitable material such as epoxy glue.

Other silver compounds found to be useful as the solid electrolyte for the electrochromic devices described above include silver iodoarsenate ($Ag_7I_4AsO_4$), silver iodovanadate ($Ag_7I_4VO_4$), silver iodophosphate ($Ag_7I_4PO_4$), silver iodopyrophosphate ($Ag_{19}I_{15}P_2O_7$) and silver iodotungstate ($Ag_6I_4WO_4$). Other suitable compounds are silver sulphur iodide ($Ag_3SI$), silver mercury selenium iodide ($Ag_4HgSe_2I_2$), and silver mercury sulphur iodide ($Ag_2Hg_{0.25}S_{0.5}I_{1.5}$).

The above disclosed combinations of materials when used at the display cell electrodes, electrolyte and counter electrode provide a reversible electrochemical system suitable for use in electrochromic display cells wherein the display electrode is a transparent yellow color when the cell is in the off condition but is changed to a dark blue or blue-black or other discernible color when the cell is turned on by the application of about 0.5 volts or less between the display electrode (−) and the counter electrode (+). The color change is reversible, i.e., the display electrodes will revert to their essentially transparent condition upon the reversal of current through the cell.

Thus, there have been disclosed systems of materials for producing an entirely solid electrochromic display cell having numerous advantages as mentioned previously. Numerous changes and modifications of the disclosed embodiments still in the spirit of the invention will suggest themselves to those skilled in the art. However, the scope of the present invention is to be limited only as set forth in the following claims.

What is claimed is:
1. An electrochromic display cell comprising:
    a display electrode comprised of an oxide of tungsten or vanadium,
    a counter electrode of an electronically conductive material taken from the group consisting of metallic silver and a silver-containing compound,
    a solid electrolyte contacting both electrodes, said electrolyte comprising a mixed inorganic silver salt including a silver iodide, and
    hermetic sealing means, including a transparent front panel through which said display electrode is visible when activated, forming a hermetically sealed enclosure within which said display electrode, said counter electrode and said solid electrolyte are disposed.
2. An electrochromic display cell as defined in claim 1 wherein said electrolyte comprises silver rubidium iodide.
3. An electrochromic display cell as defined in claim 1 wherein said electrolyte comprises silver iodoarsenate.
4. An electrochromic display cell as defined in claim 1 wherein said electrolyte comprises silver iodovanadate.
5. An electrochromic display cell as defined in claim 1 wherein said electrolyte comprises silver iodophosphate.
6. An electrochromic display cell as defined in claim 1 wherein said electrolyte comprises silver iodopyrophosphate.
7. An electrochromic display cell as defined in claim 1 wherein said electrolyte comprises silver iodotungstate.
8. An electrochromic display cell as defined in claim 1 wherein said electrolyte comprises silver sulphur iodide.
9. An electrochromic display cell as defined in claim 1 wherein said electrolyte comprises silver mercury selenium iodide.
10. An electrochromic display cell as defined in claim 1 wherein said electrolyte comprises silver mercury sulphur iodide.

* * * * *